(12) United States Patent
Hegerath et al.

(10) Patent No.: US 6,244,123 B1
(45) Date of Patent: Jun. 12, 2001

(54) MULTIPLE-SPEED GEARBOX OF 3-SHAFT DESIGN, ESPECIALLY FOR MOTOR VEHICLES

(75) Inventors: Andreas Hegerath, Bergheim; Hans Peter Nett, Adenau; Peter Dahl, Kuerten; Ulrich Eggert, Viersen, all of (DE)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/382,262

(22) Filed: Aug. 24, 1999

(51) Int. Cl.$^7$ ........................................ F16H 3/08
(52) U.S. Cl. ................. 74/325; 74/329; 74/331; 74/333
(58) Field of Search ............... 74/325, 329, 330, 74/331, 333

(56) References Cited

U.S. PATENT DOCUMENTS

| | | | |
|---|---|---|---|
| 4,461,188 | 7/1984 | Fisher . | |
| 5,458,014 | * 10/1995 | Thomas et al. | 74/325 |
| 5,609,062 | * 3/1997 | Reynolds | 74/325 |
| 5,761,961 | * 6/1998 | Krauss et al. | 74/333 |
| 6,023,987 | * 2/2000 | Forsyth | 74/331 |
| 6,044,931 | * 4/2000 | Reed, Jr. et al. | 184/6.12 |
| 6,050,152 | * 4/2000 | Alfredsson | 74/325 |

* cited by examiner

*Primary Examiner*—Sherry Estremsky
*Assistant Examiner*—Tisha D. Lewis
(74) *Attorney, Agent, or Firm*—Ford Global Technologies Inc.

(57) ABSTRACT

In a multiple-speed grearbox having a selectively switchable dual friction clutches, a first clutch connected to a first input shaft, a second friction clutch connected to a second input shaft, gears belonging to gear pairs arranged on the first and second input shafts and meshing with gears on two countershafts, one of the countershafts provided with an output pinion, the gear pairs including a fixed gear and a loose gear connected selectively with its drive shaft by a synchronizer clutch, two loose gears having with synchronizing clutches arranged between these gears arranged on the first and second input shafts, and two pairs of loose gears having synchronizer clutches arranged between them arranged on the countershaft forming the output shaft.

4 Claims, 3 Drawing Sheets

| SPEEDS | | | K1 | K2 | SU1 | SU2 | SU3 | SU4 |
|---|---|---|---|---|---|---|---|---|
| | DIRECT CONNECTED | D1 | x | | x | | x | |
| | | D2 | x | | x | | x | |
| | | D3 | | x | | x | | x |
| | | D4 | | x | | x | | x |
| | CROSS CONNECTED | C1 | x | | x | | x | x |
| | | C2 | x | | x | | x | x |
| | | C3 | | x | | x | | x |
| | | C4 | | x | | x | | x |
| | SKIP-CONNECTED | SK1 | x | | x | | | x |
| | | SK2 | x | | x | | | x |
| | | SK3 | x | | x | | | x |
| | | SK4 | x | | x | | | |
| | | SK5 | | x | | x | x | |
| | | SK6 | | x | | x | x | |
| | | SK7 | | x | | x | x | |
| | | SK8 | | x | | x | x | |

MULTIPLE-SPEED GEARBOX OF 3-SHAFT DESIGN, ESPECIALLY FOR MOTOR VEHICLES

BACKGROUND OF THE INVENTION

1. Field of the Invention.

This invention relates to the field of manual transmissions for motor vehicles, especially to those in which gears are changed without disconnecting an engine from the transmission input.

2. Description of the Prior Art

U.S. Pat. No. 4,461,188 A1 disclosed a multiple-speed gearbox of 3-shaft design, especially for motor vehicles.

In the known multiple-speed gearboxes of three-shaft design, especially for motor vehicles, use is likewise made of a selectively switchable dual friction-disc clutch in order to drive a central input shaft and a concentric hollow input shaft, and a large number of gear pairs, which mesh with one another, are connected in a driving manner to their shafts via corresponding synchronizing clutches. The known multiple-speed gearbox is in this case constructed in such a way that both of the gearbox shafts to be designated layshafts or countershafts are designed as output drive shafts, which act on a final output drive gear via a corresponding output drive pinion in each case.

In the known multiple-speed gearbox, the gear pairs are arranged in such a way that essentially only the four forward speeds and one reverse speed, which are desired for a vehicle are provided.

SUMMARY OF THE INVENTION

The object of the invention is to provide a multiple-speed gearbox of three-shaft design, especially for motor vehicles, in which, by means of the strategic arrangement of the gear pairs in conjunction with their synchronizing clutches, a large number of gear steps having different ratios can be provided, from which, in an application in the motor vehicle, various sets of at least six forward speed steps and at least one reverse speed in each case are provided by means of selective switching of the double friction-disc clutch and the synchronizing clutches and, in their selection of the ratio, can be adapted to the internal combustion drive engine and its torque being used in each case.

This object is achieved according to the invention in a multiple-speed gearbox for motor vehicles that includes a first input shaft; a second hollow input shaft concentric with and surrounding the first input shaft; first and second mutually parallel countershafts substantially parallel to the input shafts[, the first countershaft having an output drive pinion driveably connectable to an output shaft; first and second selectively switchable friction clutches, the first clutch connected to the first input shaft, the second clutch connected to the second input shaft; pairs of meshing gears, each pair having a first member supported on one of the first and second input shafts and a second member supported on one of the first and second countershafts, each pair having a gear fixed to the shaft on which it is supported and a gear journalled on the shaft on which it is supported; synchronizers for driveably connecting the journalled gears to the shafts on which they are supported located, a first synchronizer located between two journalled gears supported on the first input shaft, a second synchronizer located between two journalled gears supported on the second input shaft, a third synchronizer located between two journalled gears supported on the first countershaft, a fourth synchronizer located between two journalled gears supported on the first countershaft; and the first input shaft connectable to the second input shaft by a synchronizer clutch.

BRIEF DESCRIPTION OF THE DRAWINGS

The invention will be explained in more detail using two exemplary embodiments. In the drawings.

DETAILED DESCRIPTION OF PREFERRED EMBODIMENTS

Figure 1:
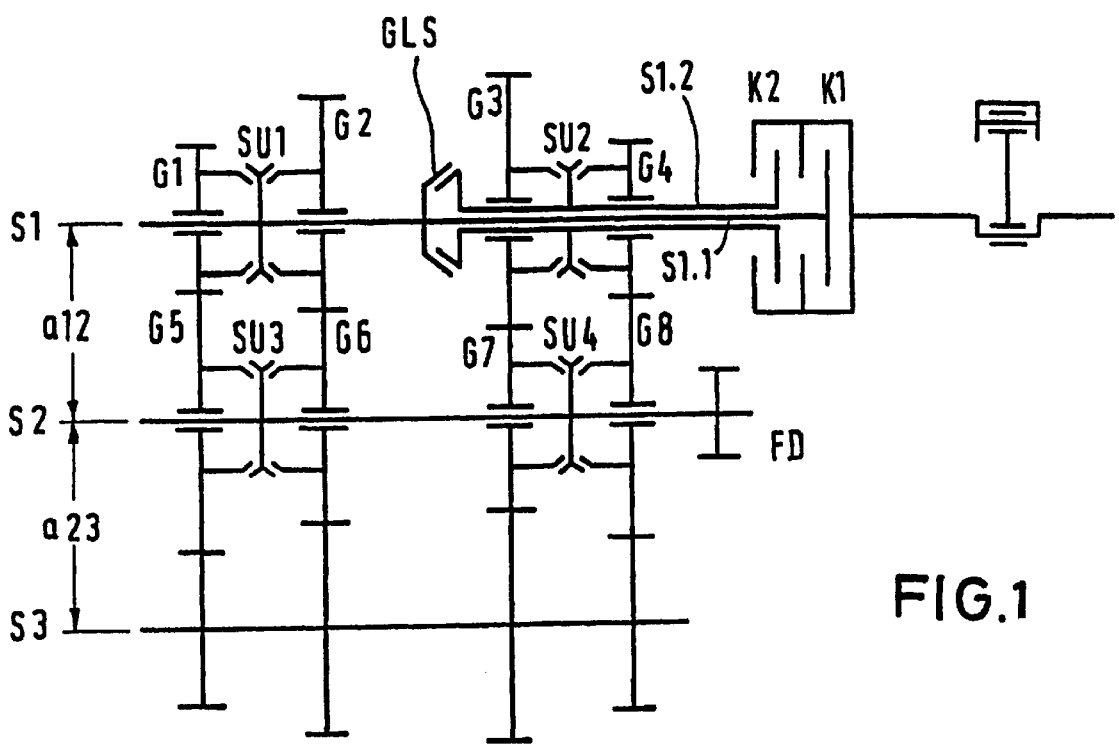
FIG. 1 shows a gearbox diagram of a first embodiment of a multiple-speed gearbox according to the invention.
Figure 2:
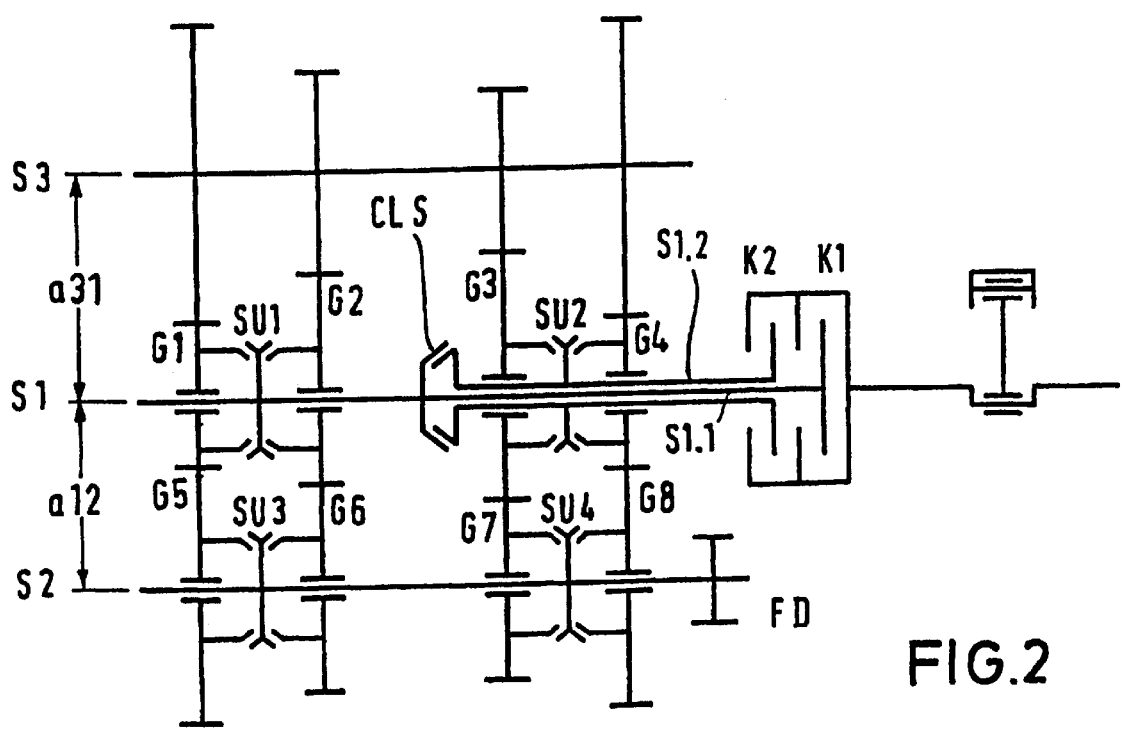
FIG. 2 shows a further embodiment of the multiple-speed gearbox according to the invention.

In FIGS. 1 and 2, identical components are provided with the same reference symbols, and the construction is explained jointly below, reference being made to the appropriate differences.

In both cases, the crank shaft of an internal combustion engine, which is illustrated only by a schematic piston/connecting rod arrangement, is connected in a driving manner to an input unit of a selectively switchable dual friction-disc clutch, which is known per se and whose separate friction-disc clutches are designated by K1 and K2.

The friction disc of the friction-disc clutch K1 drives a central input shaft S1, and the friction disc of the second friction-disc clutch K2 drives a hollow input shaft portion S1.2, which is arranged concentrically herewith.

Reference must be made to the fact that in this case the input shaft of the gearbox is generally designated by S1, whereas the two counter shafts arranged parallel thereto are designated by S2 and S3.

One of the two counter shafts S2 and S3, here in both cases the counter shaft S2, at the same time forms an output shaft, on which an output drive pinion FD for driving a final output drive gear is arranged.

On countershaft S3, the various gears are constructed in the form of fixed gears in the manner of a gear step block, whereas all the gears arranged on input shaft S1, with its subportions S1.1 and S1.2, and on counter shaft S2, are arranged as loose gears, between which in each case a synchronizer clutch SU1, SU2, SU3 and SU4 is arranged in a known manner.

A significant feature of the present multiple-speed gearbox according to the invention includes a synchronizing clutch GLS provided between the central input shaft portion S1.1 and the concentric hollow input shaft S1.2, by means of which clutch the two shafts can be rotationally fixedly connected to each other.

The components of the gear pairs, which are responsible for the speed ratios, are designated in FIGS. 1 and 2 by G1 to G8 in this case. In the directly connected speeds, the step block has no influence on the speed ratios; in all the cross-connected and skip-connected speeds, the gear pairs used by the step block for torque transmission are used also to produce the speed ratio.

The term "cross-connected" speed steps means that the dual synchronizer clutches involved here are in each case engaged in mutually opposite directions.

The term "skip-connected" speed steps means that the torque or the power flow passes through a gear pair that is idling, i.e., does not act on its shaft via its adjacent synchronizer clutch, but transmits torque to a different shaft as a loose gear.

The manner in which the large number of available speed steps is brought about will be explained below in conjunction with FIGS. 3 and 4.

Figures 3, 4:
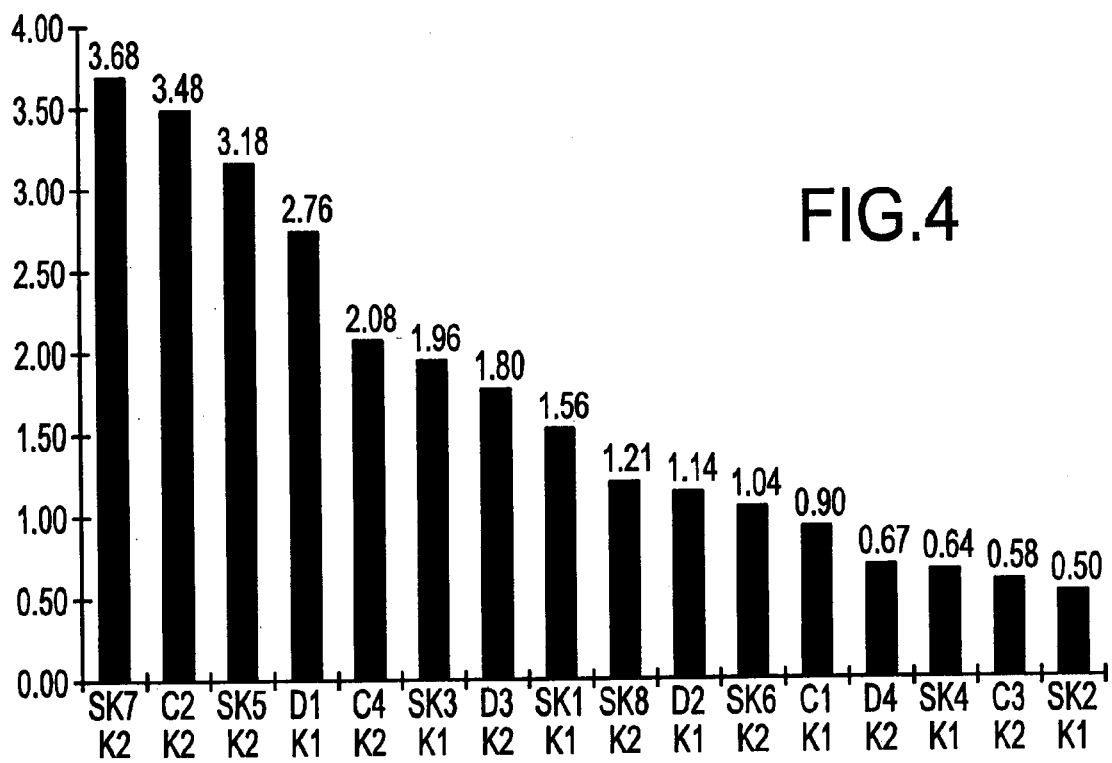
FIG. 3 shows a tabular compilation relating to the friction-disc and synchronizing clutches engaged in the various speed steps.
FIG. 4 shows a diagrammatic compilation of the sixteen forward speed steps which can be implemented with fine graduation.

As can be seen from FIG. 3, the large number of available speed steps is subdivided into three different groups, a first group of directly connected speed steps, a second group of cross-connected speed steps, and a third group of skip-connected speed steps.

However, in each case one of the two friction-disc clutches K1 or K2 must be engaged, and in each case two of the synchronizer clutches SU1 to SU4 present in the multiple-speed gearbox must be connected into the power transmission.

FIG. 4 indicates a diagrammatic arrangement of the sixteen available selector steps, the speed step which can be seen from the table in FIG. 3, and the friction-disc clutch needed for this, being indicated in each case underneath the specified ratio. As can be seen from the alternating arrangement of the friction-disc clutches K1 and K2, it is thus in each case possible to shift up from one speed step to the next highest speed step without interrupting the tractive force, by the next clutch being engaged and the preceding clutch being disengaged.

Of course, the sequence shown here of a succession of switchable friction clutches K1 and K2 will also be provided when, from the large number of sixteen speed steps, only four or else six particularly suitable speed steps matched to the torque characteristic of the internal combustion engine are selected in each case, in order within a motor vehicle to make them available to the driver in the form of a tip-shift selector mechanism, that is to say a semi-automatic selection means, or else in the form of a fully automatic, power-assisted automatic selector mechanism.

Figure 5A:
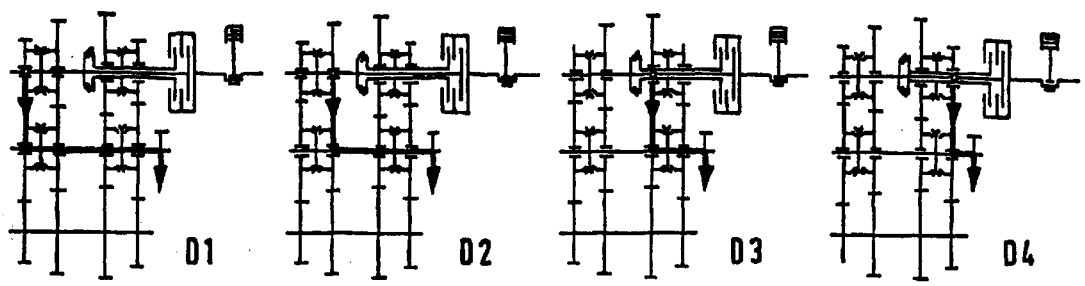
FIGS. 5a–5d show power flow diagrams in the various speed steps, FIG. 5a illustrating the direct speeds, FIG. 5b the cross-connected speeds and FIGS. 5c and 5d illustrating the skip-connected speeds.

As can be seen from a consideration of FIGS. 5a to 5d, in the direct speed steps shown in FIG. 5a, in each case only one gear pair participates in the torque transmission.

Figure 5B:
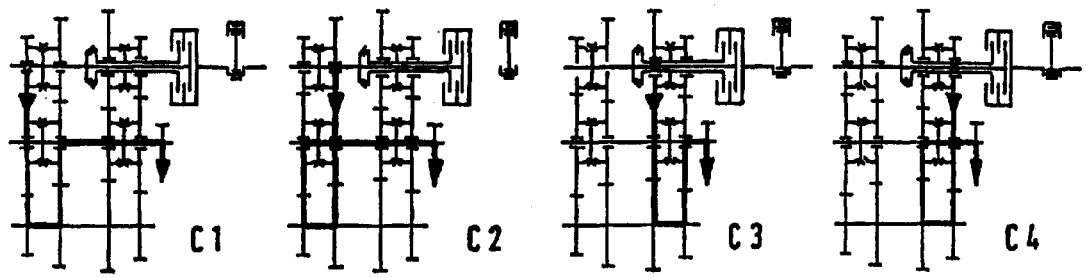

As can be seen from FIG. 5b, in the cross-connected speed steps, in each case two gear pairs participate in the torque transmission.

Figure 5C:
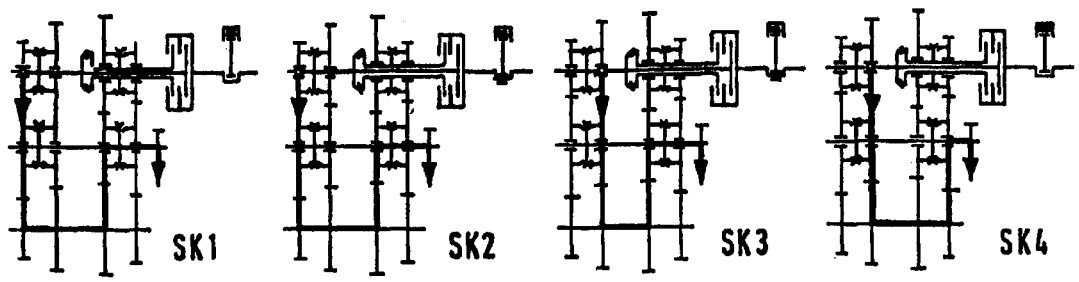
Figure 5D:
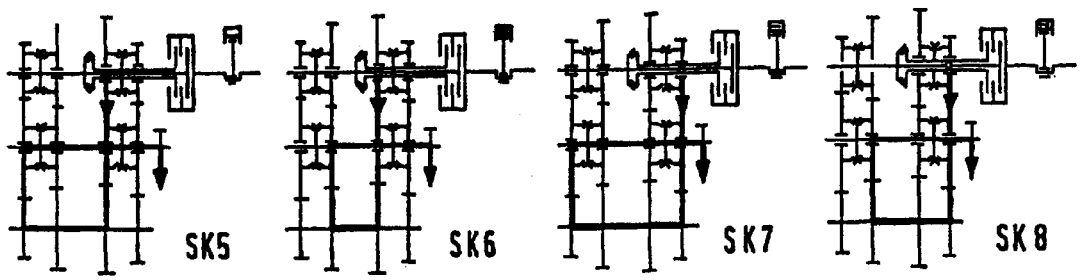

From FIGS. 5c and 5d, which show the skip-connected speed steps, it can be seen that here likewise in each case two gear pairs are involved in the torque transmission.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

What is claimed is:

1. A multiple-speed gearbox for motor vehicles, comprising:

a first input shaft;

a second hollow input shaft concentric with and surrounding the first input shaft;

first and second mutually parallel countershafts substantially parallel to the input shafts, the first countershaft having an output drive pinion driveably connectable to an output shaft;

first and second selectively switchable friction clutches, the first clutch connected to the first input shaft, the second clutch connected to the second input shaft;

pairs of meshing gears, each pair having a first member supported on one of the first and second input shafts and a second member supported on one of the first and second countershafts, each pair having a gear fixed to the shaft on which it is supported and a gear journalled on the shaft on which it is supported;

synchronizers for driveably connecting the journalled gears to the shafts on which they are supported located, a first synchronizer located between two journalled gears supported on the first input shaft, a second synchronizer located between two journalled gears supported on the second input shaft, a third synchronizer located between two journalled gears supported on the first countershaft, a fourth synchronizer located between two journalled gears supported on the first countershaft; and the first input shaft connectable to the second input shaft by a synchronizer clutch.

2. The multiple-speed gearbox of claim 1, wherein the gear pairs supported on the first and second input shafts and the first countershaft (S2) define direct speed ratios; and the gears arranged on a second countershaft mutually driveably connect the first and second input shafts and first countershaft, thereby producing cross connections and skip connections.

3. The multiple-speed gearbox of claim 1, wherein a transition from a speed ratio to an adjacent speed ratio occurs without interrupting torque transmitted between the first and second friction clutches.

4. The multiple-speed gearbox of claim 2, wherein a transition from a speed ratio to an adjacent speed ratio occurs without interrupting torque transmitted between the first and second friction clutches.

* * * * *